US008793346B2

(12) United States Patent
Ionescu et al.

(10) Patent No.: US 8,793,346 B2
(45) Date of Patent: Jul. 29, 2014

(54) SYSTEM AND METHOD FOR CONSTRUCTING SESSION IDENTIFICATION INFORMATION

(75) Inventors: Paul Ionescu, Ottawa (CA); Guy-Vincent Jourdan, Ottawa (CA); Iosif Viorel Onut, Ottawa (CA); Ori Segal, Tel-Aviv (IL); Wayne Duncan Smith, Ottawa (CA); Gregor von Bochmann, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 13/458,236

(22) Filed: Apr. 27, 2012

(65) Prior Publication Data

US 2012/0278480 A1    Nov. 1, 2012

(30) Foreign Application Priority Data

Apr. 28, 2011   (CA) .................................... 2738289

(51) Int. Cl.
*G06F 15/16* (2006.01)
(52) U.S. Cl.
USPC ........................... 709/219; 709/224; 709/228
(58) Field of Classification Search
USPC .......... 709/217, 219, 223, 224, 225, 227, 228
See application file for complete search history.

(56) References Cited

U.S. PATENT DOCUMENTS

| | | | |
|---|---|---|---|
| 5,937,181 A | 8/1999 | Godefroid et al. | |
| 6,178,394 B1 | 1/2001 | Godefroid | |
| 6,665,658 B1 | 12/2003 | DaCosta et al. | |
| 6,938,170 B1 | 8/2005 | Kraft et al. | |
| 7,328,269 B1 | 2/2008 | Danner et al. | |
| 7,363,368 B2 * | 4/2008 | Paulin ............................ | 709/224 |
| 7,546,370 B1 | 6/2009 | Acharya et al. | |
| 7,584,418 B2 * | 9/2009 | Subramanian et al. ....... | 715/234 |
| 7,680,785 B2 | 3/2010 | Najork | |
| 7,716,322 B2 * | 5/2010 | Benedikt et al. .............. | 709/224 |
| 7,827,166 B2 | 11/2010 | Garg et al. | |
| 2005/0086648 A1 | 4/2005 | Andrews et al. | |
| 2005/0246682 A1 | 11/2005 | Hines | |
| 2006/0117055 A1 * | 6/2006 | Doyle ........................... | 707/102 |
| 2007/0143742 A1 | 6/2007 | Kahlon et al. | |
| 2007/0283425 A1 | 12/2007 | Ture et al. | |

(Continued)

OTHER PUBLICATIONS

Sharma et al., "Self Adjusting Refresh Time Based Architecture for Incremental Web Crawler," IJCSNS International Journal of Computer Science and Network Security, vol. 8, No. 12, Dec. 2008, pp. 349-354.

(Continued)

*Primary Examiner* — Viet Vu
(74) *Attorney, Agent, or Firm* — Holland & Knight LLP; Brian J. Colandreo, Esq.; Jeffrey T. Placker, Esq.

(57) ABSTRACT

A computer-implemented process, computer program product, and apparatus for identifying session identification information. A recording is initiated and an operation sequence of interest is performed while recording and the recording ceases. Responsive to a determination that the operation sequence of interest was successful, information from the operation sequence of interest is saved as recorded information and responsive to a determination that a same operation sequence of interest was recorded, the recorded information from each operation sequence of interest is compared. Differences in the recorded information are identified to form identified differences and a session identifier is constructed using the identified differences.

20 Claims, 5 Drawing Sheets

(56) References Cited

U.S. PATENT DOCUMENTS

| | | | |
|---|---|---|---|
| 2008/0104256 A1 | 5/2008 | Olston | |
| 2008/0235163 A1 | 9/2008 | Balasubramanian et al. | |
| 2010/0076954 A1 | 3/2010 | Dulitz et al. | |
| 2011/0099068 A1* | 4/2011 | Takano et al. | 705/14.54 |
| 2012/0278059 A1 | 11/2012 | Benjamin et al. | |
| 2012/0278480 A1 | 11/2012 | Ionescu et al. | |
| 2012/0278699 A1 | 11/2012 | Benjamin et al. | |

OTHER PUBLICATIONS

"Practical Web Crawling Issues," http://www.chato.cl/papers/crawling_thesis/practical.pdf, downloaded May 2, 2013, pp. 1-12.

Hiraishi, "Reduced State Space Generation of Concurrent Systems Using Weak Persistency," http://www.springerlink.com/content/m4762m528544r286/, IEICE Trans. Fundamentals, vol. E77-A, No. 10, Oct. 1994, downloaded on May 2, 2013, pp. 1602-1606.

Godefroid, "Partial-Order Methods for the Verification of Concurrent Systems, An Approach to the State-Explosion Problem," 1994-1995, http://toolkit.dialog.com/intranet/cgi/present?STYLE=1360084482&PRESENT=DB=35, AN=1421034,FM=9,SEARCH=MD.GenericSearch, downloaded on May 2, 2013, pp. 1-136.

Karacali, "Simultaneious Reachability Analysis of Concurrent Systems," North Carolina State University, 2000, http://toolkit.dialog.com/intranet/cgi/present?STYLE=1360084482&PRESENT=DB=35,AN=1791309,FM=9,SEARCH=MD.GenericSearch, downloaded on May 2, 2013, pp. 1-24.

Dilworth, "A Decomposition Theorem for Partially Ordered Sets", Annals of Mathematics, Jan. 1950, vol. 51, No. 1, pp. 161-166.

Hsu et al., "Partitioning the Boolean Lattice into Chains of Large Minimum Size", Journal of Combinatorial Theory, vol. 97(1), Jan. 12, 2000, pp. 1-17.

Yeh et al., "Tracking the Changes of Dynamic Web Pages in the Existence of URL Rewriting," http://delivery.acm.org/10.1145/1280000/1273831/p169-yeh.pdf?key1=1273831&key2=7087235921&coll=DL&dl=ACM&CFID=5856056&CFTOKEN=88576545, downloaded on May 2, 2013, pp. 169-176.

Anderson, "Cominatorics of Finite Sets," Oxford Univ. Press, London, 1987, pp. vii-250.

Yeh, et al., "Tracking the Changes of Dynamic Web Pages in the Existence of URL Rewriting", Proc. Fifth Australasian Data Mining Conference (AusDM2006), pp. 169-176, 2006.

http://www.chato.cl/papers/crawling_thesis/practical.pdf, "Appendix A Practical Web Crawling Issues", pp. 1-12.

* cited by examiner

Session identification system
300

SYSTEM AND METHOD FOR CONSTRUCTING SESSION IDENTIFICATION INFORMATION

RELATED APPLICATION

This application claims the benefit of Canadian Patent Application Number 2,738,289 filed on Apr. 28, 2011, the entire contents of which are herein incorporated by reference.

TECHNICAL FIELD

This disclosure relates generally to session information in a data processing system and more specifically to identifying session identification information in the data processing system.

BACKGROUND

A typical problem arising when automatically crawling a website, is having an ability to detect session identifiers. When a client fails to provide correct session identifiers a web application will terminate the session and the crawl operation will result in poor application coverage.

Session identifiers can be transmitted as part of request parameters, cookies or other dynamic elements, for example, path constructions resulting from URL rewriting operations.

Current solutions for problems associated with session identification are typically less reliable because the solutions use heuristics including known session identifier name patterns, entropy of the value, and other heuristics. Issues associated with the current approaches include a reliance on expert knowledge to create the identifiers, and a dependency on common practices of servers to populate identifier values.

Although current detection methods can prove effective the methods typically do not cover all the cases. For example, when performing a URL rewriting operation session identifiers with a relevant value are passed in the request path such as the path sample of: GET /S(120fd4ovfqyogf34f)/home.asp HTTP/1.1 which is a non-standard or private method of transferring session information. Using the example a web crawler must be pre-configured to detect and identify the session identifier value. Because such implementations are left to the creativity of web application developers maintaining a reliable set of heuristics to identify URL rewriting session identifiers is typically impossible other than for the web application developers of the specific application.

In addition, since the session identifier values are part of a path the values can be easily confused with folder names influencing navigation of a site. A web crawler might become stuck in an endless loop because there could be an infinite set of values for the session id path element. Constructs as provided in the example can occur anywhere in a request and are very common in implementations using Web 2.0 technologies, for example Ajax callbacks.

SUMMARY OF DISCLOSURE

According to one embodiment, a computer-implemented process for identifying session identification information comprises initiating a recording, performing an operation sequence of interest while recording and ceases recording. Responsive to a determination the operation sequence of interest was successful, the computer-implemented process saves information from the operation sequence of interest as recorded information and responsive to a determination a same operation sequence of interest was recorded, compares the recorded information from each operation sequence of interest, identifies differences in the recorded information to form identified differences and constructs a session identifier using the identified differences.

According to another embodiment, a computer program product resides on a computer readable medium that has a plurality of instructions stored on it. When executed by a processor, the instructions cause the processor to perform operations comprising initiating a recording, performing an operation sequence of interest while recording, ceasing recording, responsive to a determination the operation sequence of interest was successful, saving information from the operation sequence of interest as recorded information, responsive to a determination a same operation sequence of interest was recorded, comparing the recorded information from each operation sequence of interest, identifying differences in the recorded information to form identified differences and constructing a session identifier using the identified differences.

According to another embodiment, an apparatus for identifying session identification information comprises a communications fabric, a memory connected to the communications fabric, wherein the memory contains a plurality of instructions, a communications unit connected to the communications fabric, an input/output unit connected to the communications fabric, a display connected to the communications fabric and a processor unit connected to the communications fabric. The processor unit executes the instructions to direct the apparatus to initiate a recording, perform an operation sequence of interest while recording, and cease recording. Responsive to a determination the operation sequence of interest was successful, the processor unit further executes the instructions to direct the apparatus to save information from the operation sequence of interest as recorded information and responsive to a determination a same operation sequence of interest was recorded, compare the recorded information from each operation sequence of interest, identify differences in the recorded information to form identified differences and construct a session identifier using the identified differences.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION OF THE EMBODIMENTS

Figure 1:
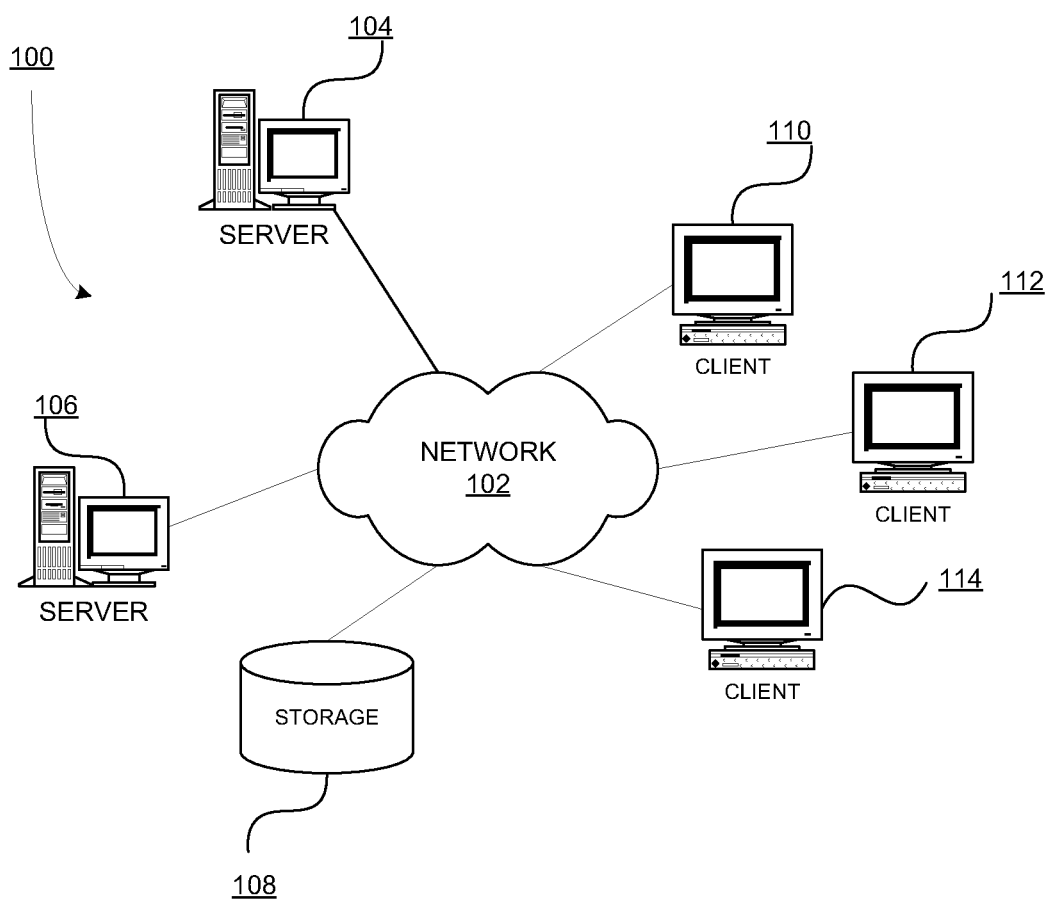
FIG. 1 is a block diagram of an exemplary data processing system network operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks or registered trademarks of Oracle and/or its affiliates. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
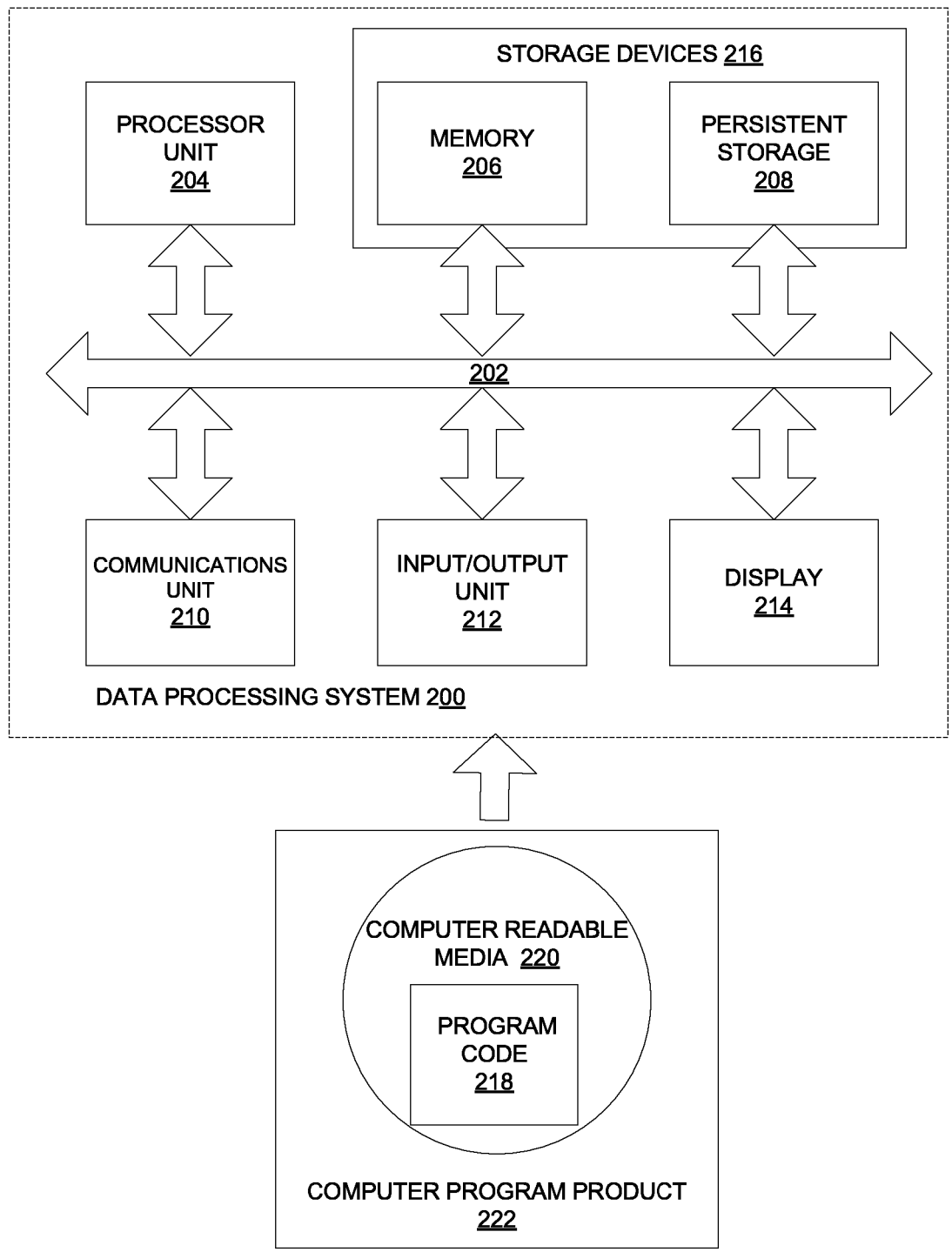
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 may be a network of computers in which the illustrative embodiments may be implemented. Network data processing system 100 contains network 102, which may be the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for identifying session identification information is presented. Processor unit 204 may initiate a recording, may perform an operation sequence of interest while recording and may cease recording. Processor 204 may receive the operation sequence of interest using communications unit 210, or input/output unit 212 or display 214. Responsive to a determination that the operation sequence of interest was successful; processor 204 may save information from the operation sequence of interest as recorded information using storage devices 216. Responsive to a determination a same operation sequence of interest was recorded, processor 204 may compare the recorded information from each operation sequence of interest, may identify differences in the recorded information to form identified differences and may construct a session identifier using the identified differences. The session identifier may be sent to a user on client 110 using network 102 of data processing 100 both of FIG. 1.

In another example, a computer-implemented process, using program code 218 stored in memory 206 or as a computer program product 222, for identifying session identification information comprises a computer recordable storage media, such as computer readable media 220, containing computer executable program code stored thereon. The computer executable program code comprises computer executable program code for identifying session identification information.

Figure 3:
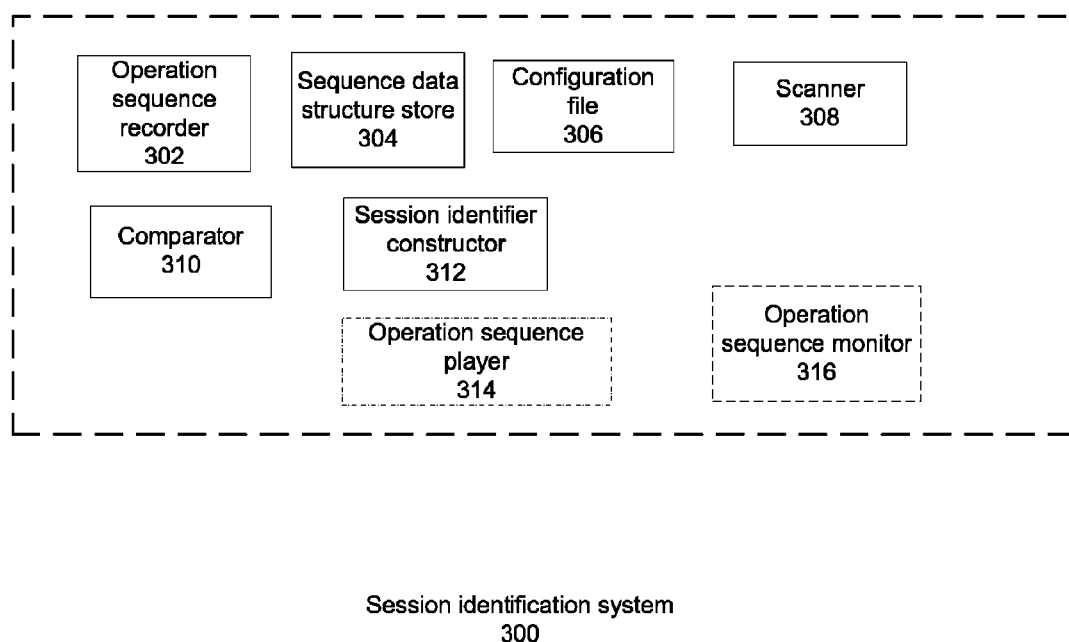
FIG. 3 is a block diagram of components of a session identification information system, in accordance with various embodiments of the disclosure.

With reference to FIG. 3, a block diagram of a session identification system, in accordance with one embodiment of the disclosure is presented. Session identification system 300 is an example of an embodiment of system for identifying session identifiers.

Session identification system 300 may leverage a supporting data processing system such as data processing system 200 of FIG. 2 within a network of data processing systems such as network data processing system 100 of FIG. 1. Session identification system 300 may include a number of components including operation sequence recorder 302, sequence data structure store 304, configuration file 306, scanner 308, comparator 310 and session identifier constructor 312. Session identification system 300 may include optional components of operation sequence player 314 and operation sequence monitor 316.

Operation sequence recorder 302 may provide a capability of recording a set of elements comprising an operation or a set of operations containing information used in determining existence of a session identifier. A set comprises one or more elements or operations. The operation sequence recorder may be activated manually and/or programmatically to save information associated with an operation of interest. Data comprising an operation of interest in the form of an operation sequence may be saved in sequence data structure store 304 for subsequent processing. Sequence data structure store 304 represents a memory suitable for storing and retrieving data in a machine-readable form. In one embodiment, operation sequence recorder 302 may be a typical web crawler from which operation sequence information is received for storage. In another embodiment operation sequence recorder 302 may be implemented as a standalone sequence recorder specific to the disclosed process.

Configuration file 306 may provide a capability of containing information used to control processing of information in an operation sequence saved in sequence data structure store 304. For example, configuration file 306 may contain information including path delimiters, operation identifiers and associated patterns. Scanner 308 may parse operation sequence data retrieved from sequence data structure store 304 using information from configuration file 306.

Comparator 310 may provide a capability to compare scanned or parsed operation sequence information to identify difference information. Difference information may be identified between information representing same operation sequences recorded at different times. Comparator 310 may use information contained within configuration file 306 to control processing of inputs received from operations of interest. For example, path delimiter information from configuration file 306 may be used to identify characters separating elements of a path used in a login sequence of interest.

Session identifier constructor 312 may provide a capability for using difference information to construct session identifier information suitable for use by a web crawler. Information from configuration file 306 may be used to provide a template for constructing a session identifier enabling differing formats to be used should a web crawler need a particular format.

Operation sequence player 314 may be an optional component providing a capability of replaying a previously recorded operation sequence. For example, when a login sequence is recorded using operation sequence recorder 302 and stored as recorded information in sequence data structure 304 the stored information may be replayed to provide a second operation sequence suitable for recording without user intervention.

Operation sequence monitor 316 may provide a capability to programmatically review operation sequences and fire an event. For example, should a predetermined operation of interest occur, such as a login sequence, operation sequence monitor 316 may activate operation sequence recorder 302 without user interaction.

Figure 4:
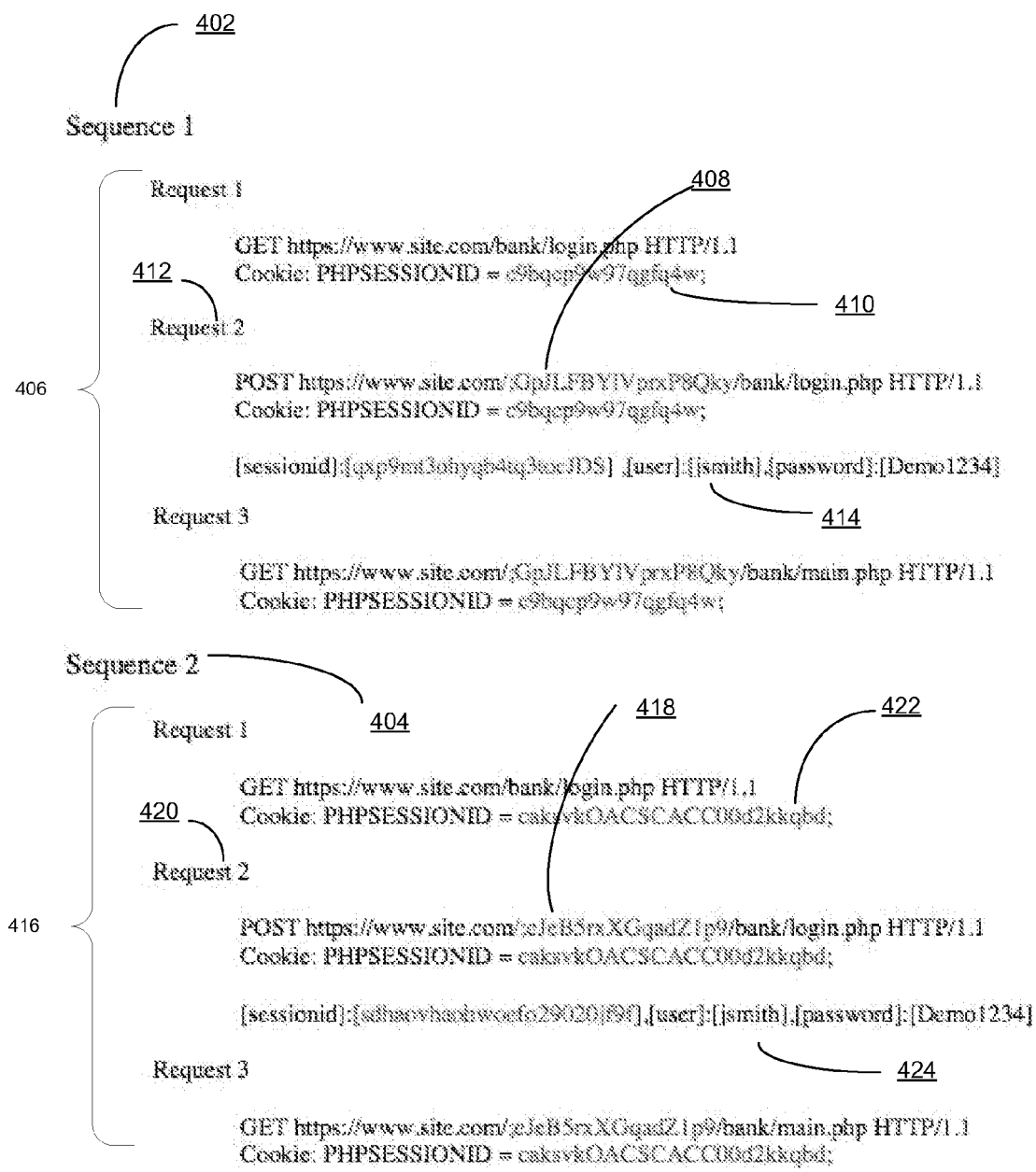
FIG. 4 is a textual representation of operation sequences, in accordance with various embodiments of the disclosure.

With reference to FIG. 4, a textual representation of operation sequences, in accordance with one embodiment of the disclosure is presented. Operation sequences 400 are examples using a pair same login sequences recorded at different points in time.

The two recorded login sequences referred to as sequence 1 402 and sequence 2 404 may comprise a set of operations of operations 406 and operations 416 respectively. Referring to sequence 1 402, request 2 412 may contain a value 408 that proceeds the /bank path element. Request 2 412 may also contain a value of the PHPSESSIONID cookie that is the same value as a value 410 of the PHPSESSIONID cookie in request 1. A user name and password combination 414 may also be provided in request 2 412.

Sequence 2 404 may correspond with sequence 1 402 having a similar set of operations 416. Request 2 420 may contain a value 418 that proceeds the /bank path element. Request 2 420 may also contain a value of the PHPSESSIONID cookie that is the same value as a value 422 of the PHPSESSIONID cookie in request 1. A user name and password combination 424 may also be provided in request 2 420.

Looking at the differences between the two login sessions of sequence 1 402 and sequence 2 404 value 408 and value 418 proceeding the /bank path element in each may be dynamically generated. In addition the value of the PHPSESSIONID cookie, value 410 and value 422 may also change between the two login sequences.

Analyzing the body of request 2 412 and request 2 420 may reveal parameters sent using a non-standard way. Although each request may be a POST operation, the operation may not have been generated through submission of a normal hypertext markup language form. The request was probably generated, e.g., using an Ajax callback routine using a format of, e.g., [<parameter_name>]:[<parameter_value>]. From the parameters provided the value of the sessionid parameter may change while user name and password 414 of request 2 412 and user name and password 424 of request 2 420 may remain the same.

Figure 5:
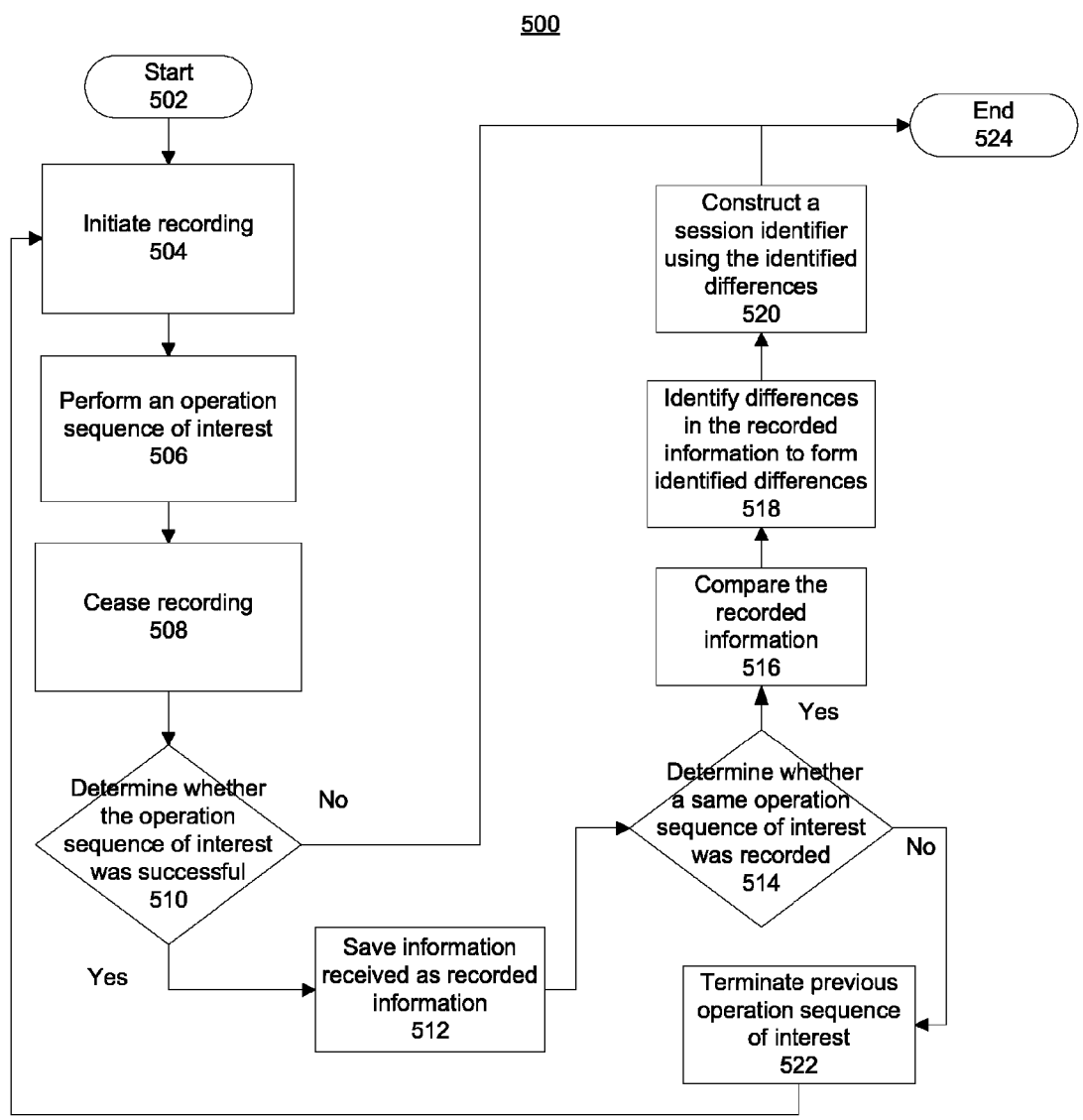
FIG. 5 is a flowchart of a process for identifying session identification information using the system of FIG. 3, in accordance with one embodiment of the disclosure.

With reference to FIG. 5, a flowchart of a process for identifying session identification, in accordance with one embodiment of the disclosure is presented. Process 500 is an example of a workflow process using the session identification system 300 of FIG. 3.

Process 500 assumes for example purposes that two recordings of a same operation sequence, for example, a log-in sequence, are done on a same website, using a same user input (for example, same user name and password) and same user actions. Failure to meet this requirement may lead to invalid results. A session may also be invalidated between recording actions or a second recording action may occur when the crawling has reached an out of session state.

Process 500 may start (502) and initiate a recording (504). A recording operation may be started to capture operation sequence information. Process 500 may perform an operation sequence of interest (506). The operation sequence of interest may be performed while a recording is active to capture information associated with the operation activity. Upon completion of the operation sequence of interest, process 500 may cease recording (508). As previously stated, the recording could be performed by a web crawler from which is received information representing the operation sequence of interest or additionally/alternatively a recording of information could be performed directly.

A determination may be made by process 500 as to whether the operation sequence of interest was successful (510). Responsive to a determination that the operation sequence of interest was successful, process 500 may save information received from the operation sequence of interest as recorded information (512). For example, when the operation sequence of interest represents a login sequence, a determination as to whether the login was successful may be made. Responsive to a determination that the operation sequence of interest was not successful, process 500 may terminate (524).

Process 500 may determine whether a same operation sequence of interest was recorded (514). Responsive to a determination that the same operation sequence of interest was not recorded, process 500 may terminate the previous operation sequence of interest (522) and returns to initiate a recording (504) as before thereby performing a second instance of the previous operation sequence of interest. Termination may ensure the session (or other possible consequences on the server side) created by the first recording is terminated enabling a second instance to have a clean start. For example, when the operation sequence of interest is a login, terminating may comprise a logout operation before returning to perform a second instance of a login.

Responsive to a determination that the same operation sequence of interest was recorded process 500 may compare the recorded information from each operation sequence of interest (516). The comparison may separate all elements of each respective operation sequence. For example path elements may be separated using predefined path delimiters such as those found in the configuration file. In a similar manner parameter values of each respective operation sequence may be separated, using, e.g., body delimiter information contained in the configuration file. Identifying the delimiters may be important because two values of the same session identifier may contain a common substring across different logins, for example, in a substring of 123454 and a substring of 123754. The comparison may be performed using, e.g., corresponding elements of the two instances of the operation sequence of interest.

A capability of identifying all parameters and cookies tracked by the crawling engine may be required to successfully perform a scan. Typical solutions may miss a point that session identifiers used by a website may by definition be unique to a session, and therefore used to uniquely identify sessions. This may apply to any request component regardless of the place or time when the request component may be constructed. However, when the website is poorly designed, this assumption may be violated in which case the website may be exposed to session fixation attacks. However, even in this case, the web crawler need not treat that request entity as dynamic because, e.g., the request entity does not change.

There is also a case in which a session identifier may maintain a same value for subsequent sessions but may expire after a period of time (e.g., session timeout). In this case, process 500 may be reapplied as in 504 after the session has expired and the session identifier can be identified in this way. In the example of login sequences, all corresponding operation sequence components recorded during two different instances of login sequences may be compared. As a result of this comparison, any corresponding variable that changes values between these two different login sequences may be flagged, e.g., as a session identifier a crawling engine needs to track. Conversely, any corresponding variable that is not different between the two sequences recorded need not be considered part of the session identifier set.

Upon comparing the information, process 500 may identify differences in the recorded information to form identified differences (518). The elements that change from one operation sequence of interest to another same operation sequence of interest may form the identified difference.

Process 500 may construct a session identifier entity using, e.g., the identified differences (520) with process 500 terminating thereafter (524). The session identifier entities may be constructed using information contained in the configuration file, e.g., to ensure the crawler can handle the constructs accordingly.

In an alternative example using a login sequence as an operation sequence of interest a need for a user to perform a login operation twice can be removed, using operation sequence recorder 302 of FIG. 2 for recording user actions and optional operation sequence player 314 to replay the recorded actions. In a further example, detection of operations of interest can be programmatically managed using operation sequence monitor 316 of FIG. 3. Use of the components may further enhance the user experience. The comparison 516 of process 500 may be generalized beyond the login sequence of the example to a set of operations performed by a user while crawling including multi-step operations such as buying an item in a virtual store. The generalized comparison may enable the crawler using corresponding elements of operation sequences of interest to identify those instances when session identifiers unexpectedly change value.

Thus is presented in an illustrative embodiment a computer-implemented process for identifying session identification information. The computer-implemented process may initiate a recording, may perform an operation sequence of interest while recording and may cease recording. Responsive to a determination the operation sequence of interest was successful, the computer-implemented process may save information from the operation sequence of interest as recorded information and responsive to a determination a same operation sequence of interest was recorded, may compare the recorded information from one or more operation sequences of interest, may identify differences in the recorded information to form identified differences and may construct a session identifier using the identified differences.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications and/or any combinations of embodiment(s) as are suited to the particular use contemplated.

What is claimed is:

1. A computer-implemented process for identifying session identification information, the computer-implemented process comprising:
   initiating a recording;
   performing an operation sequence of interest while recording;
   ceasing recording;
   responsive to a determination the operation sequence of interest was successful, saving information from the operation sequence of interest as recorded information;
   responsive to a determination a same operation sequence of interest was recorded, comparing the recorded information from each operation sequence of interest;
   identifying differences in the recorded information to form identified differences; and
   constructing a session identifier suitable for use by a web crawler using the identified differences in the recorded information, wherein the identified differences represent values generated based upon, at least in part, the operation sequence.

2. The computer-implemented process of claim 1 wherein initiating a recording comprises:
   selecting initiation from one of a manual initiation and a programmatic initiation, wherein programmatic initiation further comprises monitoring for the operation sequence of interest and responsive to detection of the operation sequence of interest, initiating the recording.

3. The computer-implemented process of claim 1 wherein performing an operation sequence of interest while recording comprises:
   performing a login sequence while recording;
   logging out; and
   replaying the login sequence to record a same login sequence, wherein the same login sequence is performed without user intervention.

4. The computer-implemented process of claim 1 wherein performing an operation sequence of interest while recording comprises:
   performing a set of operations by a user while crawling wherein the set of operations comprises one or more operations, including multi-step operations.

5. The computer-implemented process of claim 1 wherein responsive to a determination the same operation sequence of interest was not recorded, terminating a previous operation sequence of interest and initiating recording.

6. The computer-implemented process of claim 1 wherein identifying differences in the recorded information to form identified differences comprises:
   separating all elements of each operation sequence of interest in the recorded information using predefined information, including path delimiters and body delimiters contained in a configuration file; and
   comparing corresponding elements of the recorded information from each operation sequence of interest.

7. The computer-implemented process of claim 1 wherein constructing a session identifier using the identified differences comprises:
   creating a session identifier entity using information contained in a configuration file to ensure a crawler can handle constructs accordingly.

8. A computer program product residing on a non-transitory computer readable medium having a plurality of instructions stored thereon which, when executed by a processor, cause the processor to perform operations comprising:
   initiating a recording;
   performing an operation sequence of interest while recording;
   ceasing recording;
   responsive to a determination the operation sequence of interest was successful, saving information from the operation sequence of interest as recorded information;
   responsive to a determination a same operation sequence of interest was recorded, comparing the recorded information from each operation sequence of interest;
   identifying differences in the recorded information to form identified differences; and
   constructing a session identifier suitable for use by a web crawler using the identified differences in the recorded information, wherein the identified differences represent values generated based upon, at least in part, the operation sequence.

9. The computer program product of claim 8 wherein the operation of initiating a recording comprises:
   selecting initiation from one of a manual initiation and a programmatic initiation, wherein programmatic initiation comprises instructions for monitoring for the operation sequence of interest and responsive to detection of the operation sequence of interest instructions for initiating the recording.

10. The computer program product of claim 8 wherein the operation of performing an operation sequence of interest while recording comprises:
    performing a login sequence while recording;
    logging out; and
    replaying the login sequence to record a same login sequence, wherein the same login sequence is performed without user intervention.

11. The computer program product of claim 8 wherein the operation of performing an operation sequence of interest while recording comprises:
    performing a set of operations by a user while crawling, wherein the set of operations comprises one or more operations, including multi-step operations.

12. The computer program product of claim 8 wherein the operation responsive to a determination the same operation sequence of interest was not recorded comprises terminating a previous operation sequence of interest and initiating recording.

13. The computer program product of claim 8 wherein the operation of identifying differences in the recorded information to form identified differences comprises:
    separating all elements of each operation sequence of interest in the recorded information using predefined information, including path delimiters and body delimiters contained in a configuration file; and
    comparing corresponding elements of the recorded information from each operation sequence of interest.

14. The computer program product of claim 8 wherein the operation of constructing a session identifier using the identified differences comprises:
    creating a session identifier entity using information contained in a configuration file to ensure a crawler can handle constructs accordingly.

15. An apparatus for identifying session identification information, the apparatus comprising:
    a communications fabric;
    a memory connected to the communications fabric, wherein the memory contains computer executable program code;
    a communications unit connected to the communications fabric;
    an input/output unit connected to the communications fabric;
    a display connected to the communications fabric; and
    a processor unit connected to the communications fabric, wherein the processor unit executes the computer executable program code to direct the apparatus to:
    initiate a recording;
    perform an operation sequence of interest while recording;
    cease recording;
    responsive to a determination the operation sequence of interest was successful, save information from the operation sequence of interest as recorded information;
    responsive to a determination a same operation sequence of interest was recorded, compare the recorded information from each operation sequence of interest;
    identify differences in the recorded information to form identified differences; and
    construct a session identifier suitable for use by a web crawler using the identified differences in the recorded information, wherein the identified differences represent values generated based upon, at least in part, the operation sequence.

16. The apparatus of claim 15 wherein the processor unit executes the computer executable program code to initiate a recording further directs the apparatus to:
    select initiation from one of a manual initiation and a programmatic initiation, wherein programmatic initiation further comprises monitoring for the operation sequence of interest and responsive to detection of the operation sequence of interest initiating the recording.

17. The apparatus of claim 15 wherein the processor unit executes the computer executable program code to perform an operation sequence of interest while recording further directs the apparatus to:
    perform a login sequence while recording;
    log out; and
    replay the login sequence to record a same login sequence, wherein the same login sequence is performed without user intervention.

18. The apparatus of claim 15 wherein the processor unit executes the computer executable program code to perform an operation sequence of interest while recording further directs the apparatus to:
    perform a set of operations by a user while crawling wherein the set of operations comprises one or more operations, including multi-step operations.

19. The apparatus of claim 15 wherein the processor unit executes the computer executable program code to identify differences in the recorded information to form identified differences further directs the apparatus to:
    separate all elements of each operation sequence of interest in the recorded information using predefined information, including path delimiters and body delimiters contained in a configuration file; and
    compare corresponding elements of the recorded information from each operation sequence of interest.

20. The apparatus of claim 15 wherein the processor unit executes the computer executable program code to construct a session identifier using the identified differences further directs the apparatus to:

create a session identifier entity using information contained in a configuration file to ensure a crawler can handle constructs accordingly.

* * * * *